Oct. 13, 1936.       C. G. SCHMITT       2,057,540
MACHINE FOR MOLDING CANDLES
Original Filed Nov. 15, 1923     2 Sheets-Sheet 1
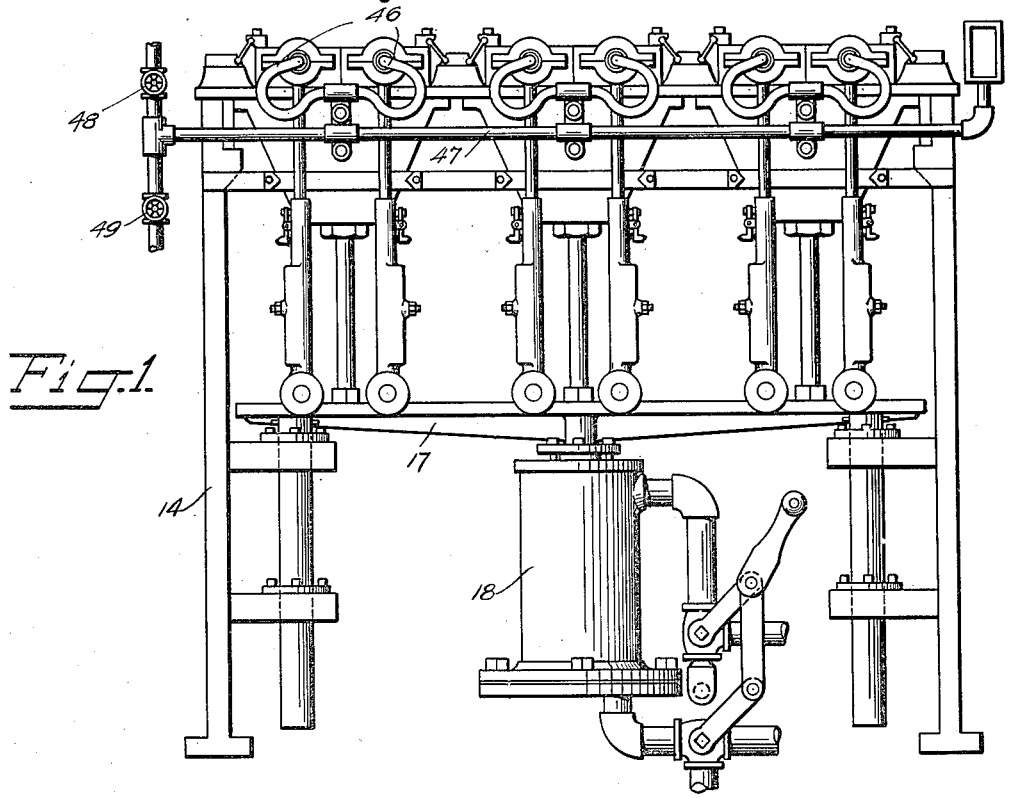
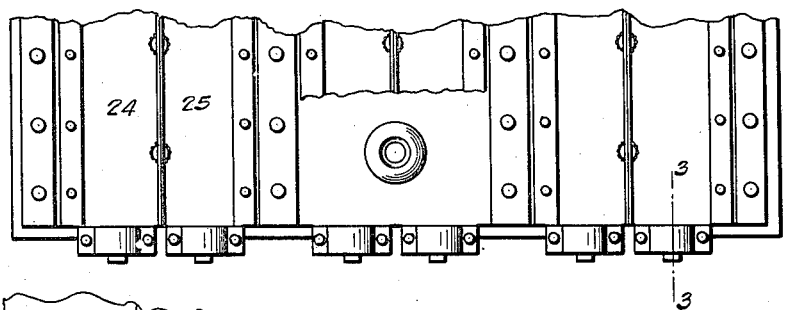
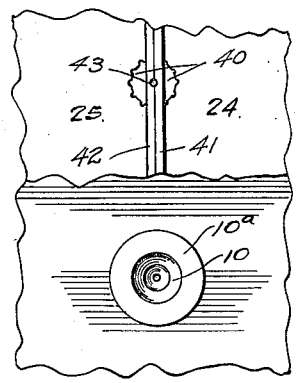
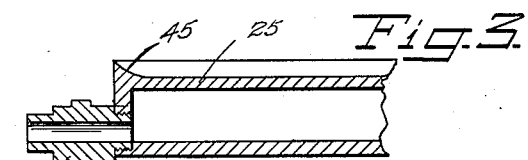
INVENTOR.
Charles G. Schmitt
BY Nathaniel Frucht
his ATTORNEY.

Oct. 13, 1936.  C. G. SCHMITT  2,057,540
MACHINE FOR MOLDING CANDLES
Original Filed Nov. 15, 1928  2 Sheets-Sheet 2
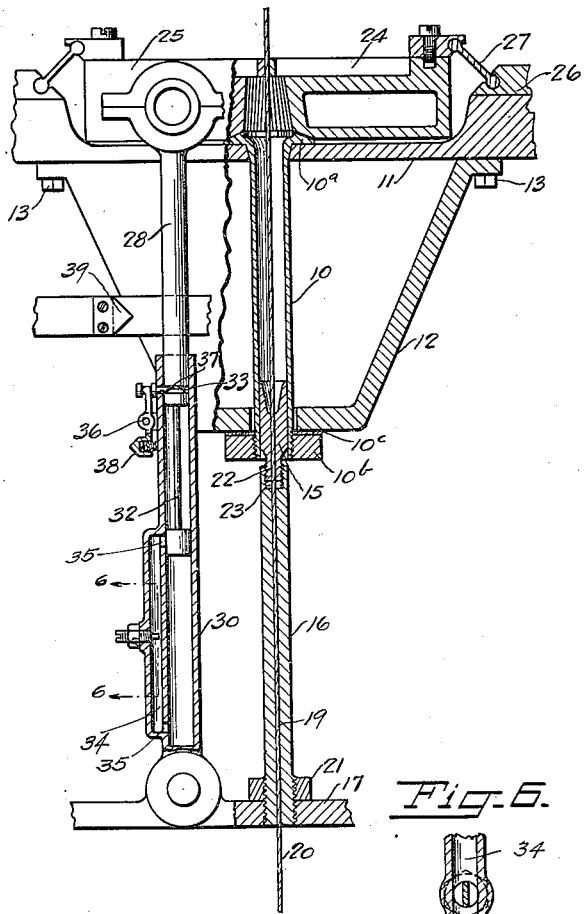
Fig. 5.
Fig. 6.
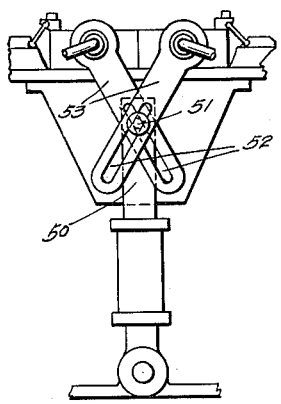
Fig. 7.
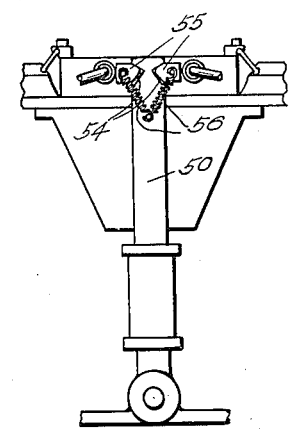
Fig. 8.
INVENTOR.
Charles G. Schmitt
BY
Nathaniel Frucht
his ATTORNEY.

Patented Oct. 13, 1936

2,057,540

UNITED STATES PATENT OFFICE 2,057,540

MACHINE FOR MOLDING CANDLES

Charles G. Schmitt, Phillipsburg, N. J., assignor, by mesne assignments, to Plastic Research and Engineering Corporation, a corporation of New York Application November 15, 1928, Serial No. 319,572
Renewed February 27, 1935

10 Claims. (Cl. 18—27)

My invention relates to candle molding machines and particularly to machines for molding candles having tapered bases, commonly known as "self-fitting-in" candles.

The present method of molding such candles is to mold the candles with the base upward, the candles being removed from the molds by means of pistons. This method necessitates the use of loose or separate base pieces which adhere to the candles when ejected from the molds and must be removed by hand, and replaced in the molds by hand thus tending to become mixed, bent, or lost.

My present invention is designed to avoid these disadvantages by eliminating the need for detachable base pieces. One object of my invention is to simplify quantity production of candles of this type.

Another object of my invention is to manufacture tapered base candles complete with wick in a single operation.

Another object of my invention is to provide efficient and easily controlled means for alternate heating and chilling of the molds.

Other objects of my invention relate to the specific construction of my improved molding machine as disclosed in the detailed description which follows, and in the accompanying drawings, wherein:

Fig. 1 is an end elevation of my improved molding machine;

Fig. 2 is a fragmentary plan view, partly broken away to show the lower portion of the mold;

Fig. 3 is an enlarged section of Fig. 2 on the line 3—3 showing the grooved slope of the upper mold section for facilitating removal of surplus wax, and the eccentric for laterally displacing the upper mold section during upward movement;

Fig. 4 is an enlarged plan view of the center portion of Fig. 2 showing the lips of the base mold sections extending over the corrugated wax inlet openings;

Fig. 5 is a sectional view of a single mold, partly broken away, showing the relationship of the mold, the ejecting piston, and the base mold lifting mechanism;

Fig. 6 is an enlarged detail on the line 6—6 of Fig. 5, of the adjustable regulator controlling flow of liquid in the base mold lifting mechanism;

Figs. 7 and 8 are elevations showing modifications of the base mold lifting mechanism.

Considering Figs. 1 and 5, a series of candle molds 10 are secured in spaced relation between a horizontal plate 11 and trough shaped casings 12 secured to the plate 11 by any suitable means 13. Each individual mold 10 has a positioning shoulder 10a, and is drawn tightly in position between the plate 11 and the bottom plate of casing 12 by a lock nut 10b, the packing 10c rendering the juncture with the bottom plate fluid tight. The plate 11 is supported and held in position by an angle-bar framework 14, the casings and plate cooperating to form hollow box-like chambers for permitting heating fluid and chilling fluid to alternately contact with the candle molds.

A tapered piston 15 positioned within each candle mold 10, forms the bottom of the mold and is utilized to hold the lower end of the wick in position, and to eject the molded candles. Each piston 15 has a piston rod 16 operatively secured to a movable platform 17, a hydraulic lift 18 of the type disclosed in my copending application Ser. Number 258,028 February 29, 1928 being suitably controlled by the operator to furnish an easy and gradual ejecting means for the completed candles.

Both the piston 15 and the piston rod 16 are drilled as best shown in Fig. 5, to provide a passage 19 for the wick 20; the wick 20 is unwound from a drum (not shown) rotatably journaled beneath the floor upon which the molding machine stands.

The piston rod 16 is removably screwthreaded into a retaining boss 21, secured to the platform 17, in any suitable way, to provide for an adjustment of the piston 15 within the body mold for obtaining candles of different heights. The piston 15 has a threaded extension 22 entering a threaded bore 23 in the piston rod 16 to provide a supplemental adjustment for the same purpose.

The base mold is formed by two wing sections 24, 25 hinged to standards 26, which are preferably integral with upper horizontal plate 11, by means of bar hinges 27 of the type described in my co-pending application.

The wing section lifting mechanism includes rods 28 cooperating with eccentric lifting nipples 29 secured to the sections 24, 25 to move each section about its hinge 27 on upward movement of the platform 17, thus permitting ejection of the completed candles by the upwardly moving pistons 15. Each nipple 29 may have a rib 29a cooperating with grooves provided in the split upper section of rod 28, to prevent lateral displacement. Each rod 28 is slidably positioned in a cylindrical housing 30 pivotally mounted on platform 17, and has an extension piston element 31 secured thereto by a rod 32, and a groove 33. The housing 30 has a by-pass duct 34 communicating with the interior of the housing through ports 35, the housing and duct being filled with fluid, preferably glycerine; an adjustable deflector, mounted in the by-pass duct, regulates the fluid flow from the housing to the space between piston element 31 and rod 28. A spring pressed trip lever 36, pivoted on the upper end of housing 31, normally holds a pin 37, passing through an opening in the housing, into engagement with the groove 33 for retaining the rod 28 in its upper position; toe 38 of the lever 36 engages a stationary stop 39 mounted on the framework 14 to trip the lever and move the pin 37, thus permitting upward movement of the housing 30, and therefore of the piston 15, with respect to the rod 28. The liquid in the housing flows upwardly, during such upward movement of the housing, and downwardly, on downward movement of the housing, lever 36 and pin 37 again locking the rod 28 in position at the end of such downward movement. The wing sections may interlock at the ends thereof, if desired.

Each section 24, 25 has an opening 40 adjacent the inner edges thereof and located over each candle mold 10, the openings forming circular inlets for admission of wax to the molds; lips 41, 42 integral with or suitably secured to the wings 24, 25, traverse the wax inlets 40 and have small circular recesses cooperating to form openings 43, which serve as positioning means for the upper end of the candle wicks.

The openings 40 have corrugations 44 for providing the usual corrugated bases of this type of candle; however, the openings 40 may if desired, be made circular whenever a plain tapered base is preferred.

The lips 41, 42 and sides of the sections form troughs for receiving the poured wax, the edges 45 (note Fig. 3) sloping down to form a convenient means for removing the surplus wax.

Each section 24, 25 is hollow and is provided with flexible conduits 46 attached to lifting nipples 29, these conduits receiving heating or chilling fluid from a fluid supply conduit 47, which conduit also supplies the casings 12 through valve controlled inlet pipes.

A steam inlet pipe 48, valve controlled, permits the flow of heating fluid around the molds before the wax is poured in, and water inlet pipe 49, valve controlled, affords means for passing chilling fluid about the molds and the poured candles therein. The casings and sections have valve controlled drain pipes, (not shown) on the other side, and are sloped so as to freely drain; each casing and section also has the usual plug-closed openings (not shown) for permitting periodic cleaning.

Two modified forms of mechanism for permitting ejection of the candles are shown in Figs. 7 and 8. In Fig. 7, the housing 30 is replaced by a rod 50 having a pin 51 engaging slots 52 in levers 53 rotatably mounted on eccentrics 29, the rib 29a being omitted, if desired. In Fig. 8, the rod 50 has cam surfaces 54 engaging lifting blocks 55, the springs 56 permitting upward movement of rod 50 when the wing sections are displaced out of the path of the upwardly moving candles, and reseating the wing sections as the rod 50 descends.

The operation of my improved machine is as follows: The pistons 15 being in the raised position after the removal of one group of completed candles, the group of candles is positioned in the racks secured above the molds, as is common practice in molding this type of candle.

The operator now opens his hydraulic control valve, and the wing sections and pistons lower into the positions shown in Figs. 1 and 5, the upper ends of wicks 20 depending from the completed candles and being positioned within openings 43 between the lips 41 and 42; as the piston 15 descends the wicks 20 slowly unroll from the wick drums and are properly maintained in vertical position within the mold.

Steam is now admitted through pipe 48 and conduit 47 and exhausts through the outlet pipe. The heating fluid passes around the molds 10 and into the wing sections to heat the base molds and also the troughs formed in the tops of the wing sections. After the molds have been heated to the proper temperature, wax or other suitable candle material is poured into the troughs and enters each mold through openings 40. When the molds are filled, the steam is shut off, and the surplus wax is removed by scooping down the sloped edges 45 and along the troughs formed by members 41, 42, and the sides of the sections with a flat trowel or similar device. This removal of surplus wax also completes the formation of the base of the candle, making such base flat at the upper end of the base mold.

Pipe 48 is now shut, and water is now admitted from pipe 49, to freely circulate the chilling fluid around the candle and base molds. After the valve in pipe 49 is shut off, the outlet pipe is kept open for a limited time in order to drain the hollow chambers; the operator then turns his hydraulic control valve and causes the simultaneous upward swinging of the wing sections and the ejection of the completed candles; the candles are discharged from the molds by the pistons so that they clear both wing sections, the latter receding simultaneously in order to permit an unobstructed upward movement of the candles.

As the wing sections are turned, the trip lever 36 trips, and permits the piston 15 to furnish the ejecting movement. Thus a perfect product is secured, all scraping by abrasions or contact with the base mold being prevented, the candles being polished and trimmed automatically as they are forced upwardly so as to leave the machine in a finished and perfect condition ready for packing.

Although I have described my invention in connection with the manufacture of candles having tapered bases, I do not wish to be limited to such use, as my invention is capable of molding materials other than wax.

I claim as my invention:

1. In a molding machine, upper and lower plates, a plurality of body molds therebetween, movable bottoms in each body mold each having a mold recess, base mold frames hingedly mounted on the upper plates, base mold sections in said frames cooperating with said body molds, means operatively connected to the frames for swinging the frames to move the base mold sections and permit free ejection of a molded article, and means for moving the bottoms to eject molded articles from the body molds.

2. In a molding machine, upper and lower plates, a plurality of substantially cylindrical body molds therebetween, movable bottoms in each body mold each having a mold recess, base mold frames hingedly mounted on the upper plates, tapered base mold sections in said frames cooperating with said body molds, means operatively connected to the frames for swinging the frames to move the base mold sections and permit free ejection of a molded article, and means for moving the bottoms to eject molded articles from the body molds.

3. In a molding machine, upper and lower plates, a plurality of body molds therebetween, movable bottoms in each body mold each having a mold recess, base mold frames hingedly mounted on the upper plates, base mold sections in said frames cooperating with said body molds, means for positioning wicking in the body molds, means operatively connected to the frames for swinging the frames to move the base mold sections and permit free ejection of a molded article, and means for moving the bottoms to eject molded articles from the body molds.

4. In a molding machine, upper and lower plates, a plurality of substantially cylindrical body molds therebetween, movable bottoms in each body mold each having a mold recess, base mold frames hingedly mounted on the upper plates, tapered base mold sections in said frames cooperating with said body molds, means for positioning wicking in the body molds, means operatively connected to the frames for swinging the frames to move the base mold sections and permit free ejection of a molded article, and means for moving the bottoms to eject molded articles from the body molds.

5. In a molding machine, a body mold, a movable bottom therein having a mold recess, a movable base mold adjacent the body mold top, and operating mechanism engaging the movable bottom and the movable base mold for simultaneously moving the bottom to eject a molded article and for moving the base mold out of the path of the ejected article at a speed greater than the speed of ejection of the molded article.

6. In a molding machine, a body mold, a movable bottom therein having a mold recess, a sectional base mold adjacent the body mold top, and operating mechanism engaging the movable bottom and the movable base mold for simultaneously moving the bottom to eject a molded article and for moving the base mold sections out of the path of the ejected article at a speed greater than the speed of ejection of the molded article.

7. In a molding machine, a body mold, a movable bottom therein having a mold recess, a movable base mold adjacent the body mold top, and operating mechanism engaging the movable bottom and the movable base mold for simultaneously moving the bottom to eject a molded article and for moving the base mold out of the path of the ejected article, said operating mechanism including means for increasing the speed of movement of the base mold in relation to the speed of movement of the ejected article.

8. In a molding machine, a body mold, a movable bottom therein having a mold recess, a sectional base mold adjacent the body mold top, and operating mechanism engaging the movable bottom and the movable base mold for simultaneously moving the bottom to eject a molded article and for moving the base mold sections out of the path of the ejected article, said operating mechanism including means for increasing the speed of movement of the base mold sections in relation to the speed of movement of the ejected article.

9. In a molding machine, a section containing a body mold, a base mold section having split portions mounted adjacent said first section and having a base mold communicating with the body mold, means comprising a movable bottom having a mold recess for ejecting a molded article from the body mold, and means for moving the split base mold portions apart in advance of the ejecting movement of the molded article to permit free ejection of the molded article.

10. In a molding machine, a section containing a body mold, a base mold section having split portions hingedly mounted adjacent said first section and having a base mold communicating with the body mold, means comprising a movable bottom having a mold recess for ejecting a molded article from the body mold, and means for swinging the split portions apart in advance of the ejecting movement of the molded articles to permit free ejection of the molded article.

CHARLES G. SCHMITT.